US007287093B2

(12) United States Patent
Lynch et al.

(10) Patent No.: US 7,287,093 B2
(45) Date of Patent: Oct. 23, 2007

(54) E-BUSINESS MOBILITY PLATFORM

(75) Inventors: Mark Lynch, Dublin (IE); James M. Carr, Dublin (IE); Rotan Hanrahan, Dublin (IE); Eamonn Howe, Dublin (IE); Brian Kinane, Dublin (IE); Paul McGaley, Dublin (IE); Thomas Fennelly, Mountmellick (IE)

(73) Assignee: MobileAware Technologies Limited, Dublin (IE)

( * ) Notice: Subject to any disclaimer, the term of this patent is extended or adjusted under 35 U.S.C. 154(b) by 466 days.

(21) Appl. No.: 09/920,943

(22) Filed: Aug. 3, 2001

(65) Prior Publication Data

US 2002/0035617 A1    Mar. 21, 2002

(30) Foreign Application Priority Data

| Aug. 4, 2000 | (EP) | ................................ 00650094 |
| Dec. 11, 2000 | (EP) | ................................ 00650206 |
| Feb. 6, 2001 | (EP) | ................................ 01650013 |

(51) Int. Cl.
*G06F 13/00* (2006.01)

(52) U.S. Cl. .................................................. 709/246
(58) Field of Classification Search ................ 709/203, 709/248, 246, 200; 607/60; 700/83; 715/513
See application file for complete search history.

(56) References Cited

U.S. PATENT DOCUMENTS

| 6,400,990 B1 * | 6/2002 | Silvian .......................... 607/60 |
| 6,400,996 B1 * | 6/2002 | Hoffberg et al. ............... 700/83 |
| 6,430,624 B1 * | 8/2002 | Jamtgaard et al. ........... 709/246 |
| 6,519,617 B1 * | 2/2003 | Wanderski et al. ......... 715/513 |
| 6,779,042 B1 * | 8/2004 | Kloba et al. ................. 709/248 |
| 2002/0052916 A1 * | 5/2002 | Kloba et al. ................. 709/203 |
| 2002/0069218 A1 * | 6/2002 | Sull et al. ................. 707/501.1 |

FOREIGN PATENT DOCUMENTS

WO    WO99/62239    12/1999

(Continued)

OTHER PUBLICATIONS

IEEE—Kubitz et al., "Client-server-based mobile robot control", IEEE/ASME Transaction on vol. 3, Issue: 2, Jun. 1998, pp. 82-90.*

(Continued)

*Primary Examiner*—Robert B. Harrell
(74) *Attorney, Agent, or Firm*—Reed Smith LLP (57) ABSTRACT

A platform (1) allows end users to engage in a session with servers such as content providers, corporate systems, commercial services or ASPs. A session object is associated with each session, attributes of which include the channel—thereby allowing changing of a channel during a session. Request/event objects are associated with the session object as requests/notifications arise, and these objects are shared with other modules. Hosted services may be physically resident on the platform or may be accessed transparently via interfaces. A device/channel neutral mark-up language extended from a presentation mark-up language is used as a single common form from which the delivered content is derived. The content from a service is generated by an executable process, normally (but not exclusively) in the extended mark-up language. The derivation of deliverable content is performed via a dynamic and configurable sequence of providers that manipulate the original content in stages.

16 Claims, 3 Drawing Sheets

FOREIGN PATENT DOCUMENTS

WO      WO00/39666      7/2000

OTHER PUBLICATIONS

Freytag et al, Computers & Graphics 23 (1999), pp. 841-848, Resource adaptive WWW access for mobile applications.

Abrams et al, XML Conf. Proceedings, "UIML: An XML Language for Building Device-Indepenedent . . . ", pp. 1-15, Dec. 1999.

MOBILEAWARE: "MobileAware launches best-of-breed E-Business Mobility . . . ", XP002166594, 1 page, Nov. 20, 2000.

MOVILEAWARE: "New Internet Mark-Up Language provides massive boost to mobility", XP002166596, 1 page, Dec. 12, 2000.

Austaller et al, Informationssysteme Fur E-Commerce . . . , "Gulliver Beans: A Tool for . . . "pgas. 1-13, Nov. 8-10, 2000.

Pemberton et al, World Wide Web Consortium, "XHTML 1.0: The Extensible HyperText Markup . . . ", pp. 1-30, Jan. 26, 2000.

Bracht et al, Internet Online, "ACTS Project AC052, Prospect", pp. 1-62, 1998.

Koga et al, IEICE Trans. on Communications . . . , "An Interworking Architecture Between . . . ", pp. 1393-1400, Oct. 1, 1997.

Berndt et al, Proc. of the Int'l. Switching . . . , "Service Architecture, Service Session . . . ", p. 225, Apr. 23, 1995.

Sammoud et al, IEEE Global Telecommunications . . . , "In-Tina Architecture: Integration of . . . ", pp. 1613-1618, 1998.

Freytag et al, Computers & Graphics 23 (1999), pp. 841-848, Resource adaptive WWW access for mobile applications.

\* cited by examiner

E-BUSINESS MOBILITY PLATFORM

FIELD OF THE INVENTION

The invention relates to provision of applications and/or content to end users and interaction between end-users and end-user communities in a mobile environment. A mobile environment is one where the end-user is free to change any variable parts of the user context (such as device, location, or communication channel).

PRIOR ART DISCUSSION

In recent years there has been a rapid development of technologies both for the end user to receive content and applications and for hosting of the content and applications. At the user end a wide range of devices including Personal Computers (PCs), handheld computers, Wireless Application Protocol (WAP) phones, Personal Digital Assistants (PDAs) or Digital Television (DTVs) may be used. Content providers and corporate systems also use a number of different technologies including servers communicating using Hypertext Markup Language (HTML), Extensible HTML (XHTML), and other Extensible Markup Language (XML) compliant languages, as popular in the World-Wide Web.

It is believed that there is a shift from software product delivery to software services delivery. This shift has been growing in recent years towards a situation in which there will be a ubiquitous array of thin-client devices (computing devices that play the lesser role in the execution of a service) that are always connected to centralised server-based application services (the major role player).

Current wireless technology is developing in a direction that is parallel but not convergent with this transition. In fact, technologies such as WAP focused mobility at the protocol level and built an environment parallel to contemporary Internet standards. This approach is insufficient to address the requirements of mobile users as it does not enable usability advantages at the levels of the e-business application and Web authoring process.

It is also recognised that the Web authoring process does not capture all of the information available to the author, such as the author's underlying intentions (e.g. an author may use mark-up tags to render two separate paragraphs in the same colour, but the underlying intention is to indicate to the user that these paragraphs are related). To support re-purposing of content, this missing information is invaluable.

It is therefore an objective of the invention to provide a mobility server platform to integrate true mobility, service creation, service delivery and Web authoring in an effective and versatile manner.

Other objectives are to:
  allow content providers to easily provide personalised application and content in terms of behaviour and presentation to users on the appropriate devices without the need to rewrite and maintain content in many different formats;
  allow company staff and/or registered users to have a single secure and personalised point of access to all distributed application services, regardless of device used;
  allow Application Service Providers (ASPs) to make their applications available to users via any device and to manage different communities and share applications among groups in an efficient, cost effective, and secure manner, and
  allow operators to package applications for personalised delivery to end-users according to their lifestyle (personal requirements, behaviour and preferences).

SUMMARY OF THE INVENTION

According to the invention, there is provided an e-business mobility platform comprising a request handler interface for interfacing with user devices, a content interface for interfacing with content servers, means in the content interface for retrieving content requested by a user device and for routing the content to the request handler interface for onward routing to the requesting user device characterised in that,
  the platform further comprises a transformation engine comprising means for dynamically transforming the content to a suitable format for the user device by processing intention and task tags in the content.

In one embodiment, the intention tags include tags for linking related blocks of content, and the transformation engine comprises means for maintaining said relationships in the content delivered to a user device.

In another embodiment, the task tags include tags for indicating information that is optional or alternative for a user device having different interfacing capabilities than other devices.

In one embodiment, the transformation engine comprises means for converting the retrieved content to a document object model (DOM), and means for transforming the DOM to a device format.

In one embodiment, the DOM is transformed by parsing tags indicating blocks of content and associating blocks with nodes of the DOM.

In one embodiment, the transformation engine comprises means for combining content by combining DOMs generated from different incoming content streams.

In a further embodiment, the transformation engine comprises means for applying user preferences to the device-format content.

In one embodiment, said preferences are applied by dynamically retrieving preference data from a user database and modifying the content accordingly.

In one embodiment, the transformation engine comprises means for dynamically activating providers in series for a session, said providers being for performing a transformation-related function.

In one embodiment, at least one provider comprises means for caching reusable intermediate data captured from a stream of content being transformed, and at least one other provider comprises means for using cached data.

In another embodiment, a provider comprises means for caching user preference data In one embodiment, the platform comprises a database system and all functions of the platform comprises means for accessing said database system via accessors each dedicated to a data type.

In one embodiment, the data types include user, group, and device data types.

In one embodiment, the platform comprises a messaging system comprising means for controlling communication within the platform by passing objects representing events between functions.

In a further embodiment, the user device interface comprises means for causing a session manager to generate a session object upon receipt of a user device request, and said session object comprises means for controlling full execution of the session until delivery of the requested content even if the user device changes.

In one embodiment, the session manager comprises means for maintaining a list of sessions for each user and for caching the associated content.

In one embodiment, the device interface comprises a device detection function for detecting device attributes, and the session manager comprises means for using said attributes to create a session object.

In one embodiment, the device detection function comprises means for accessing a hierarchical device database to retrieve device attributes.

DETAILED DESCRIPTION OF THE INVENTION

The invention will be more clearly understood from the following description of some embodiments thereof, given by way of example only with reference to the accompanying drawings in which.

Figure 1:
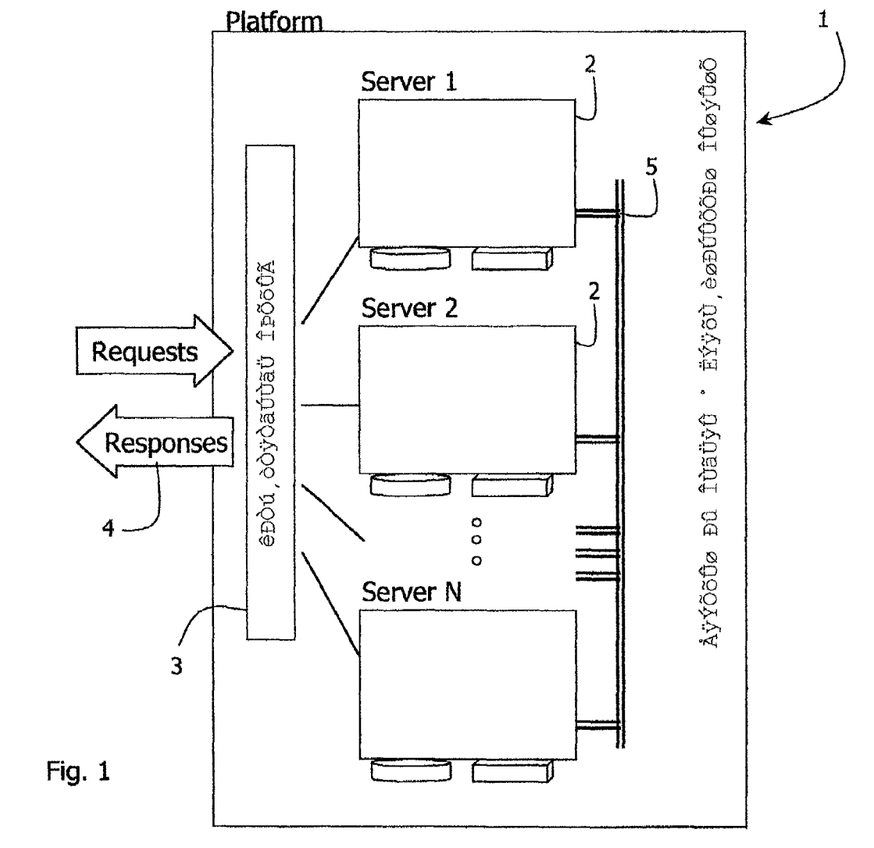
FIG. 1 is an overview schematic representation of e-business mobility platforms.

Referring to FIG. 1 an e-business mobility platform 1 comprises N servers 2, a load balancing system 3, a device-side interface 4, and a high-speed network 5 providing access to content servers. The network 5 also allows sharing of resources across the servers 2. There may alternatively be only one server 2 and associated infrastructure without a load balancing system.

Figure 2:
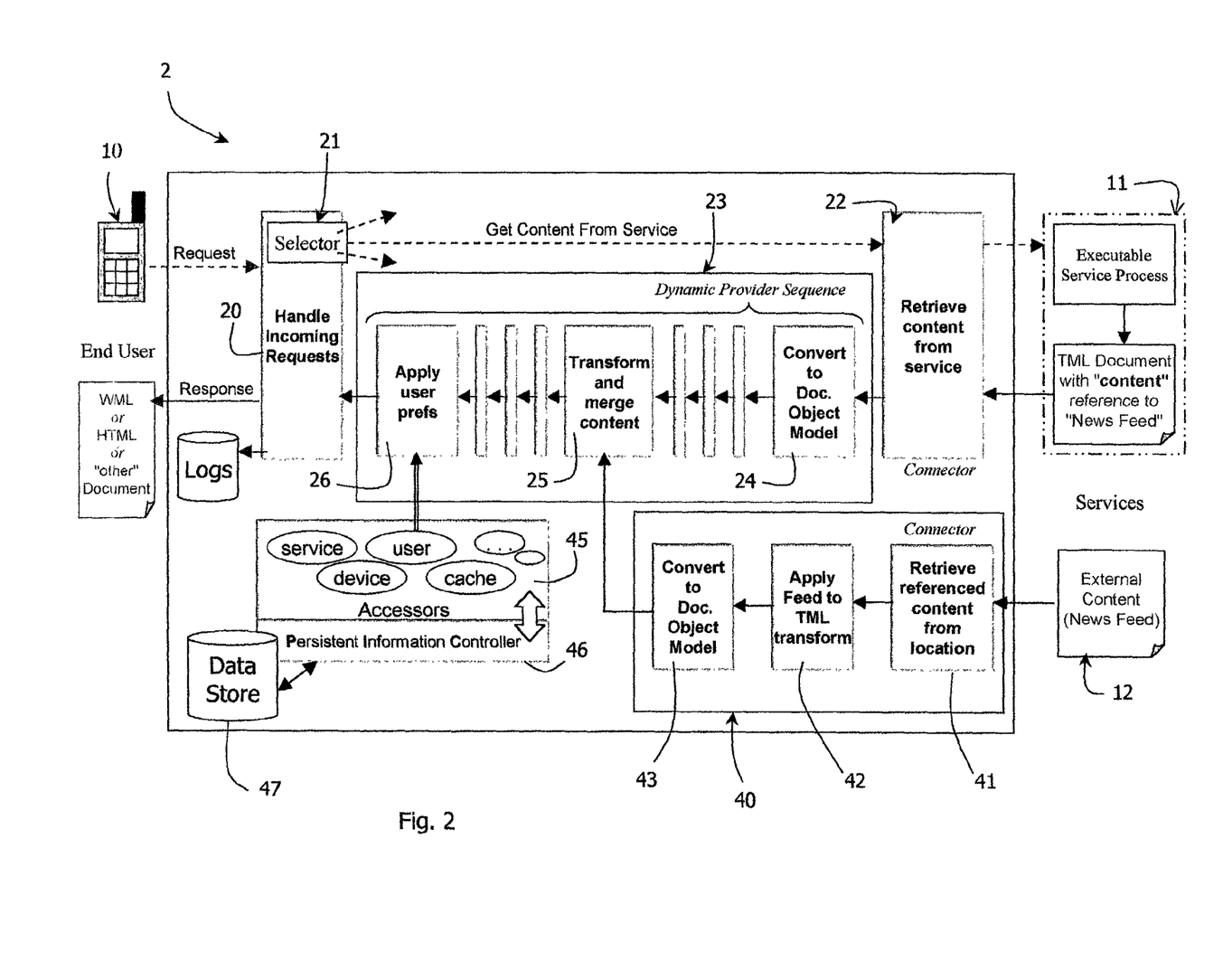
FIGS. 2 and 3 are diagrams illustrating a platform in more detail.

Referring to FIG. 2 the architecture of each server 2 comprises an interface 20 for handling incoming requests from user devices. In this specification the term "user device" is intended to cover non-mobile devices such as desktop PCs and also different software interfaces such as different combinations of fixed or mobile hardware and software used by users to access content or executable applications. The term "content" is intended to cover both information for presentation and also executable code. In other words, it covers anything which can be either rendered or executed by the user device.

The interface 20 comprises a selector 21 for identifying the requested service. An interface 22 provides an interface to content servers.

The functionality between the interfaces 20 and 22 is, at a high level, a session controller. This controls communication on the basis of a complete session, not on the basis of the particular link being used. Thus, if a user starts a transaction using a browser on a PC, stops using the PC, and then wishes to continue the transaction with a mobile phone the session controller can maintain continuity. Switching from one device to another is simply changing of a session parameter, not terminating the session itself.

The session controller functionality comprises a transformation engine 23, which converts the content from a task/intention markup language (TML) to a particular protocol suitable to the requesting device. It achieves this by selecting a sequence of functions to perform the conversion. Among the selected functions are:

a conversion function 24 for receiving content and converting it to a document object model (DOM), a transform function 25 for merging the DOM with another received from a function 43 and transforming the DOM;

an output function 26 for applying user preferences and outputting the content in a device protocol to the interface 20.

A separate instance 40 of the transformation engine include additional content into the first instance 23 of the transformation engine. The engine 40 may retrieve content from a separate source. In cases where the separate source does not offer TML, the transformation engine 40 selects a set of functions to create TML from the source, and among the selected functions are:

a function 41 for retrieving content (such as news data from a news feed 12) in conventional (non-TML) language, a function 42 for transforming non-TML content to TML, and a conversion function 43 for converting the TML to a DOM.

The output of the function 43 is merged with that of the function 24 by the function 25.

The server 2 also comprises accessors 45 to access persistent (non-temporary) data associated with the delivery of the service and a persistent information controller (PIC) 46 to connect the accessors 45 to a database 47.

Figure 3:
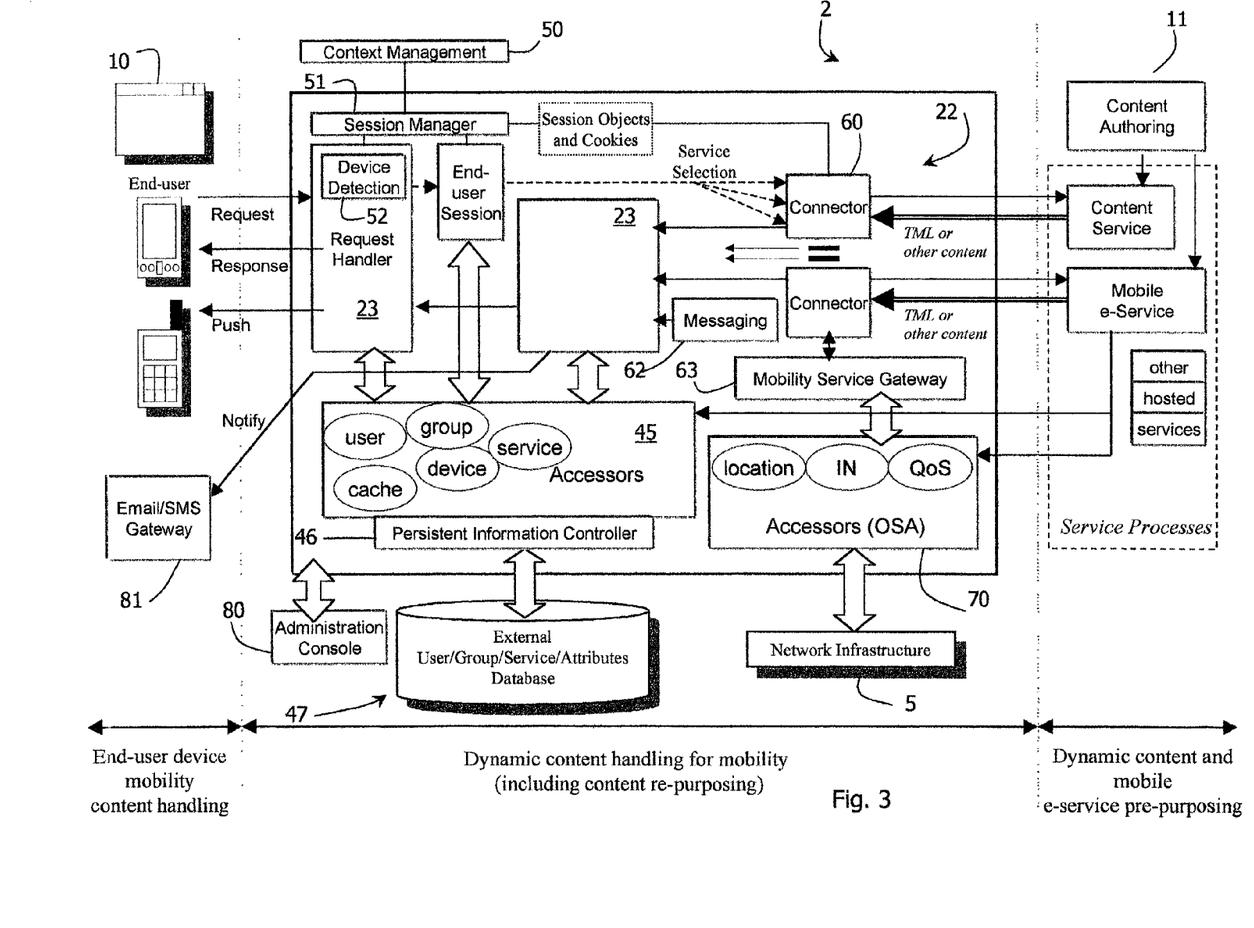

Referring to FIG. 3, the server 2 is shown in another view in which detail of the transformation engine is not shown, but other functions are. The server 2 comprises a remote context management function 50 to access a session manager 51 linked to the request handling interface 20. The session manager 51 performs overall session control, including generation/retrieval of session objects for each received content request. The session manager 51 is provided to enable executable service processes gain access to the data associated with session objects.

The content-side interface 22 comprises connectors 60 and 61 for access to various sources of content, and a mobility service gateway 63 for access to infrastructural data. A messaging system 62 is linked with the transformation engine 23 so that notification messages (in the form of email, Short Message Service objects or other push formats) can be created for delivery via an external gateway/server 81.

Accessors 70 are provided to obtain data from the underlying communications infrastructure, such as data provided by Open Systems Architecture (OSA) functions, which can be used to influence the content to be delivered and the manner of its delivery. For example, the Quality Of Service (QoS) accessor can be used to determine if the communications channel has sufficient capacity to delivery the content at the required level of quality.

The following describes the server 2 in more detail.

Persistent Information Controller (PIC) 46

The PIC presents a data abstraction to the functions, representing the main forms of data (users, groups, services, devices) their relationships (hierarchy and inter-hierarchy) and security configuration (access control lists). The PIC maps these abstractions to actual data storage in the form of the relational database 47. The PIC 46 is structured in a way that it can be modified to re-map some or all of the data to other types of data storage.

Request Handler Interface 20

This implements an API to accept requests from end-users in the form of Universal Resource Indicators, together with zero or more end-user defined parameters. This interface triggers the session manager 51 to create a session object, and the processing of the request is then passed to the service selection function 21 forming part of the request handler interface 20. Creation of a session object involves detecting a cookie in the request, and if present, locating the object within a collection of session objects using the cookie as a search key. If a cookie is not present in the request, a new unique cookie is created and a new session object associated with the new cookie. New cookies are delivered to the client along with the response content so that the client can supply the cookie in subsequent requests.

The interface 20 comprises a device detection function 52, which utilises a configurable hierarchical device database that is used to recognise the type of device making a request, and for similar devices to inherit shared properties. The device detection function 52 uses information in the client request to recognise the type of device in use and can obtain further information about the device from details held in the device database.

The interface 20 can be configured to pass or not pass certain headers from devices to back-end servers and vice versa where the back-end server or device requires this information.

Remote Context Management Function 50

The server 2 allows back-end servers to make remote callbacks to the server 2 to query/update session and persistent information via the function 50. A secure one-time key is used to identify the correct session and provide security.

Transformation Engine 23

This parses server responses and generates a representation of content based on session object attributes and transforming the input content. The engine 23 acts by first identifying the type of the original content (as provided by the hosted service via a connector) and the type of content required by the end user's device (subject to parameterised variations such as user preferences). Then it identifies a set of data/content manipulation components (providers) and a sequence of use such that by applying the providers in the identified sequence the original content can be constructed and/or transformed into a form acceptable to the end-user device.

New providers can be programmatically added to the set of available providers to support additional construction or transformation features. This is achieved by adding compliant code to the provider class hierarchy and implementing a common provider interface.

TML represents presentation, intention, and task information for the content delivered by the servers 11. Most markup languages represent presentation attributes, however, prior art languages do not represent the intention of the content author or the task (based on device information) to be performed during deliver. When authoring the content using TML the author inserts tags to indicate intention, and the following is an example:

<mm-group id="g1" title="main topic"><p><font color="red">
This is a paragraph about the main topic of this page.
</font></p></mm-group>
<p>This is a second paragraph. It is an aside, and not strongly related to the first.</p>
<mm-group-ref idref="g1"<><p><font color="red">
This is a third paragraph, related directly to the first.
</font></p></mm-group-ref>

In this TML sample the author has explicitly indicated that the first and third paragraphs are related, by using intention tags. In this case, the author has chosen to use "group" tags to indicate that the selected paragraphs form part of a common group. This information can be used programmatically to ensure that the related paragraphs are presented together, regardless of the final content format. In the sample, the author has chosen to colour the related paragraphs in red, but this is a presentation attribute that is insufficient to infer that the paragraphs are indeed related. The group tags clarify that a relationship between the paragraphs was intended. When transforming this content to a different format, such as a device-specific mark-up language, the transformation process applies appropriate layout and/or presentation features such that the author's intention to group the content is preserved.

The following is an example of representation of task information:

<p>This paragraph contains an icon
<mm-exclude useragents="smallbrowser/html">
(shown here: <img src="bigdot.jpg" alt="big">)
</mm-exclude>
that the author has decided should not be displayed on small browser devices.</p>

In this TML sample the author has outlined a decision that will be made at the time when the content is being delivered to the user. The decision here is to omit some content that the author has concluded would not be right for a small browser. This deferred action based on a property of the session context is an example of a task tag.

Since TML is an extension of a popular and well-understood presentation mark-up language, for which the authors have ample tools and experience, and since the tools themselves must be extendable to support the extensible presentation mark-up language, TML can be integrated into existing authoring tools 11 thus avoiding the need to create new authoring tools or the need for authors to learn a completely new mark-up language. This approach gives the author a familiar environment, enables the author to capture non-presentation properties of the content (intention) and gives the author a degree of control over what happens to the content when it is being re-purposed for different devices.

When the original content is in a TML format, the first provider (the conversion function 24) builds an internal (in-memory) object hierarchy representation of the content (a Document Object Model), which is subsequently manipulated using the task/intention-oriented information to guide the content creation/transformation process. The transformation function 25 is an extendable set of TML-to-"other format" programs, which are efficiently implemented as object-oriented processes in the same programming language as used by the server for maximum compatibility. The transformation function 25 is configured with run-time parameters and custom transformation rules. Custom rules are applied to specific devices. For example, a device that claims to support HTML but does not properly support the <h6> (heading) tag could apply a rule that says "replace all <h6> tags with <b> tags", which would have a similar presentation effect (i.e. it would embolden the text). Custom rules are normally used to correct deficiencies and/or take advantage of special features in devices.

Data that passes from one provider to the next in the engine 23 may be offered by the server 2 as a candidate for information caching, which can enhance performance. This is achieved by inserting cache providers into the sequence of providers so that the cache providers can access and store intermediate data as it passes from one construction/transformation provider to the next. Only content that can be re-used may be cached. Cache providers may also retrieve content from storage instead of obtaining it from a construction/transformation provider earlier in the sequence. Retrieving content from storage would be performed when there is a performance benefit compared to the content being generated by a construction/transformation provider.

Usage Tracking Function

The server 2 logs usage information derived from the request handler 20 in an extensible, industry-standard format to allow usage analysis with widely available tools. Data gathered in the logs through the usage tracking function of the request handler 20 can be delivered to analysis and monitoring features for off-line processing, or in real-time via the messaging function 62.

Transformation Engine Output Function 26

This function provides for the distribution of messages to end-users based on their subscriptions. End-users subscribe to a message topic indicating which delivery channel they prefer: email/text, email/html or Short Message Service (SMS). When a message arrives in the server 2 it is transformed per subscription to either Email or SMS and delivered to the end-user. The server logs the successful handoff of messages to an end-user. Support for SMS sending in the server is configurable, with an SMS being emitted by the server via a telephone modem or directly to the SMS Messaging Centre.

Messaging Function 62

This manages communication within the server 2. It is an efficient real-time internal distributed notification function that alerts the various components to changing situations. It carries objects representing events (usually associated with sessions) and operates in a publish/subscribe mode to support asynchronous delivery of data (as notification/event objects). The messages may be passed through the transformation engine, or directly to the recipients unaltered. The message system also supports the gathering of data for billing, performance logs, monitoring and administration. The message function 62 is based on a clustered Java Message Service (JMS).

Cookie Management in the Transformation Engine 23

For situations where the server 1 is hosting a service, a mechanism is provided to manage the cookies that may be returned to the server 2 from this service. Cookie management within the server 2 addresses the management of session and persistent cookies (unique codes representing contextual data) in this situation. Incoming cookies are appropriately stored depending on their type (HTTP Session or database), while on outgoing requests cookies are sent back by the server 2 upon a user re-visiting a previously visited site.

The cookies are used by the session manager 51 to map from cookies to session objects. In this way, requests bearing the same cookie can be associated with the same session. Furthermore, the session manager generates a list of active sessions for a given user, which are presented to the user to enable the user rejoin a session that had previously been suspended. The end-user can rejoin a session on any device, which enables the user to move from one environment to another while still being able to interact with services within a session. This feature supports end-user lifestyle requirements (i.e. freedom to move and change contextual parameters).

Security Module

A security module (not shown) provides security facilities for communications between the platform 1 and external actors (e.g. end-users). It performs user authentication, certificate creation, certificate verification, digital signatures, single sign-on and message encryption. The security module may optionally provide some or all of its features through separate security solutions from third parties, integrated as hosted services. Security between entities managed by the PIC is handled via access control lists (also maintained by the PIC), which determine what forms of access are permitted between objects that represent the entities. For example, a service entity may be granted read access to one of a user's preference attributes but may not be granted any access to other attributes associated with different services.

Error Handling

An error handling function (not shown) allows an administrator to configure the server 2 to redirect to an error handling JSP page or alternatively to deliver a textual description of the error to the client. This provides "graceful" behaviour in error situations.

Administration

An administration console 80 is a visual interface to an administration API of the server 2 database 47 that enables an administrator to manipulate and configure resources such as services, principals (users), devices and various attributes. Through the administration console 80 an administrator may create, modify and remove resources. This functionality allows an administrator to register services, maintain devices and device characteristics and allocate service/content packages to end-users and groups.

Additional Features

The server 2 permits the addition of new functions to support features that may not be readily accessible via connectors (end-providers). These include drivers to access parameters of the communications network, such as Intelligent Network (IN) drivers and Open Systems Architecture (OSA) drivers, which can be used to provide features such as client location tracking, quality of service measurement, communication security parameters etc.

Additional Hosted Service Modules

End-user service providers (content providers) can add their business logic as a module within the server 2. These are accompanied by a set of executable service processes to handle requests and/or events associated with the service, and any other information such as appropriate access rights that would be assigned by the administrator via the Administration Console (or programmatically via the Administration API). Users and groups can then be granted access to the service, attributes can be defined for the service and values assigned to the attributes on behalf of users and/or groups.

Application Programming Interfaces of the Server 2

Context Management API

A context management API enables remote access to PIC 46 data. In one embodiment this API is supplied in the server 2 in the form of a JSP context manager that can be accessed in JSP code through a context manager (JSPCM) object. Pages expressed in JSP with access to the JSPCM can use PIC data in the generation of content and can also update PIC 46 data. The JSPCM can also execute remotely from the server 2, using middleware to communicate securely with the platform 1. The JSPCM is subject to security rules, in the form of access control lists. An SDK API locates a remote context manager that a server may use to make callbacks to the server 2.

Authoring API

An authoring API can apply the enhanced markup of the server 2 to content prior to delivery via the platform 1. This API also permits access to preview features that may use the server 2, or operate independently of the platform using a stand-alone version of the transformation engine.

Request API

This API is used by the request handler interface 20 to forward requests for content to the content providers. Providers may use HTTP or other protocols as carriers for requests for content. Provider proxy sub-modules implement the request API and the API of the provider to facilitate content requests to specific content providers.

Connector API

The interface 22 comprises connector APIs 60 and 61. A connector maps a request within the server 2 to a request that can be delivered to a separate server. Connectors can create requests in alternative protocols, and can convert data formats where necessary. For example, a Simple Object Access Protocol (SOAP) connector would take a request from the interface 20 (or from a hosted service) and convert it into a SOAP request that would be passed to a SOAP server, whereupon a SOAP response would be generated that would be received by the SOAP connector and reformatted as text, TML or some other format acceptable to the transformation engine or hosted service. New connectors for alternative protocols or formats can be added to the server 2 by the addition of executable code that implements the Connector API.

An administration API provides a means of accessing the platform configuration information held in the PIC, and to view/modify dynamic information such as gathered statistics generated by the server 2. Access to the API is through a secured channel.

Categorisation of Function Features

Function features fall into several categories:

Interrogation. An interrogation feature is used by a session execution process to acquire information that will subsequently be used to guide the process. The methods of the JSPCM, the PIC and its accessors are examples of interrogation features.

Action. An action feature is used to commence a selected activity, selected through a decision taken by a service execution process. This would normally be initiated by a user request or notification event. The action feature may return status information and/or content for delivery to the end user.

Notification. A notification feature is a source of events (represented as event objects) that are passed to the message system for subsequent delivery to functions that have registered interest in specific events.

Mediation. A mediation feature enables data from a source to be presented to another module in a form acceptable to the other module. The content transformation engine 23 is an important mediation feature in the server 2, and the providers in this module in turn provide more specific mediation features. Connectors that enable the server 2 to access data from external servers are also mediation features.

Administration. An administration feature is used by an administration module to control, monitor or modify other modules and/or the configuration data of the platform.

Management of Data

Databases

There are four types of entity stored within the database 47. These are Users, Groups, Services and Devices. All of these data are hosted within the same database management system (DBMS). The data are accessed via the accessors 45, which are objects that interact with the PIC 46 to manipulate the platform data. Security of this data rests with a security mechanism provided by a database management system. The type of data in detail are:

User A "principal" entity that represents a single end-user. Incorporated in this data is a representation of the user's description, preferences and other data that is used to deliver services to this specific user.

Group A "principal" entity that represents an aggregation of zero or more Users (as described above). The group corresponds with a set of users who share a commonality, specifically with respect to a service. Groups are arranged hierarchically.

Service An entity that describes a service, including the URI that is used in the mapping maintained by the service selection mechanism. Services are arranged hierarchically.

Device An entity that describes the characteristics of a known end-user device or browser. The device entities are arranged in a hierarchy with increasing depth in the hierarchy representing further refinements of device characteristics.

Attribute An entity that describes a value (type and range). An attribute can be used by other entities. For example, an integer "age" attribute could be used by a User entity to describe the age of the end-user in years, which could in turn be used by a service to tailor the content.

Intermediate Data

The content construction/transformation processes produce intermediate data. Since it is possible that this data will be the same for some subsequent requests from other users, this data is made available for caching. Intermediate data that is not a candidate for caching, or is not accepted for caching, is disposed.

Session Data

The session with an end-user, comprising more than one related request, requires contextual data to be retained for the duration of the session. Each request following the initial request in a session will be accompanied by a cookie (a unique code) with which the contextual data can be located. This data is stored in a mobility session object.

Executable Service Processes

Every service hosted by server 2 can be accessed by the end-user via a request adhering to a specific format of URI. Once identified, the request will lead to the execution of a service process whose responsibility is to provide content for the "leaf" provider in the sequence of providers set up by the transformation engine 23.

Many executable service processes are represented by a Java Server Page (JSP), which is an object derived from a combination of mark-up and embedded program statements. The output of a JSP process in server 2 is normally a TML document, other formats would be converted to (or included in) a TML document.

It is permitted for executable service processes to be implemented in programming languages, scripts or decision mechanisms other than Java, and to output content other than TML. It is a requirement that all executable service processes will announce the Multimedia Internet Mail Extension (MIME) type of the content and output the actual content in a manner consistent with JSP regardless of the actual implementation language.

Operation of Server 2

Operation of the server 2 is now described with reference to FIGS. 2 and 3. The server 2 essentially acts as a broker in which parties belonging to Application Service Provider (ASP), content provider and network operator interact with each other and with end users regardless of the communication and file formats used. Thus, for example, a user may order food from the restaurant, and the restaurant may use the server 2 to track location of delivery personnel in real time, and it may also use the server 2 to communicate with service providers who create maps and provide routing information and finally communicate service details (e.g. estimated time of arrival of the delivery personnel) to the end-user regardless of the device and communication channel used by the user.

An incoming request from an end user is directed to the request handler interface 20. This monitors messages to determine data such as the user identification and details about the device used by the user. The request handler interface 20 and the session managers 51 use this data to create a mobility session object and associated data objects and these are made available to other functions in the server 2. The functions in the server 2 use direct calls and messaging functions to pass these objects to each other. One such module function is the selector 21, which automatically maps the request data in the mobility session object to an executable service process.

The session manager 51 and the PIC 46 may be regarded as persistent memory of the server 2 from the perspective of how an event/request is handled.

The executable session process writes to a session context via the session manager 51, including data such as the user session status or user's mobile number. This data is important as it allows the platform to handle a wide range of different user devices and associated protocols, as indicated in FIG. 2.

The results of the executable service process called by the selector 21 are added to the context via the session manager 51 and/or delivered to the transformation engine 23. The engine 23 will note the type of content being supplied and the type of content required by the user's device and will select a set of providers to manipulate the input content in a sequence of steps. Generally, the executable service processes will generate a response expressed in TML, and a TML transformation provider will form part of the engine 23 sequence, and this provider will transform TML into one of the supported output formats such as HTML, WML, SMS, Simple Mail Transport Protocol (SMTP), fax or Voice Mark-up Language (VoxML).

Another aspect of the transformation engine 23 is that it may produce a composite response comprised of more than one sub-response (or page), and will make elements of this composite response available to the client on demand (starting by default with the first element). This form of response is used where the original response from the hosted service is inappropriately large for the client's browsing device. The engine 23 may add additional inter-page links to enable the client navigate through the set of pages derived from the original response.

It will be appreciated that the invention provides a platform 1 comprising one or more instances of server 2, that achieves the objectives set out in the introductory part of this specification. It provides excellent flexibility for connection of end users to servers. For example, it allows ASPs to provide software as a service on per-user basis with flexible licensing and billing arrangements. The platform effectively allows users to fully control their interaction with e-services through a fully personalised interface. The settings for personalisation include function, location, time, device, and other system and application-specific settings from which the user can choose. The platform 1 also allows ASPs and portals to host multiple corporate or commercial services and applications on the same server. These can be grouped and shared by different user groups. Also, it will be appreciated that the security module provides advanced industry-standard authentication and authorisation for control of access to applications and data. Also, because of the clustered multi-server hardware architecture, the platform 1 is highly scaleable and there is excellent reliability because of redundant clustering.

At a more fundamental level, the platform provides solutions to the three primary problems concerned with mobility personalisation: (a) presentation personalisation, (b) behaviour personalisation, and (c) activity personalisation. This is set out in more detail below:

Presentation Presentation personalisation uses the device modelling and multi-channel publishing mechanisms to categorise devices and map said devices to a set of properties, thereby creating a Multi Channel Publisher (MCP) that provides automated functions to transform content to the target device through the device properties. The device modelling is based on an innovative device hierarchy tree.

The MCP combines the best of automated translation with a high-level task/intention oriented mark-up language compliant to XML. This mark-up can be used in standard web authoring processes that enable web content to be structured for multi-device translation without recourse to producing device-specific mark-up.

Behaviour Behavioural personalisation is achieved through the engine 23 together with user/group preference data in the PIC 46, which allows data to/from hosted services to be intercepted, and mobility logic be applied in order to customise/personalise the request or response to the mobility requirements. This mechanism is capable of modelling the notification, time, device location, preferences and other attributes of the end-user and the end-user's device and extending standard actions with such requirements. The behaviour personalisation can be applied to a user or a group of users.

Activity Activity personalisation is focused on a scenario in which the Internet will be populated by many service providers who offer specific vertical services to end-users (e.g. booking a flight), potentially offered with other vertical services through a service portal. The server 2 allows such service providers to export their capabilities as hosted services via connectors 22, to allow personalised activities to be built up by end-users through the combination of features from multiple services. The Messaging System and Administration module also allows such processes to be tracked and reported.

The device-centric modelling capabilities employed by the server 2 enable publishing of a user-personalised interface services to different devices.

The invention is not limited to the embodiments described but may be varied in construction and detail. For example, the platform may comprise one or any other number of servers, depending on the required capacity.

The invention claimed is:

1. An e-business mobility platform comprising:
   a request handler interface for communicating with a user device to receive a request for content and for downloading the content to the requesting user device in a format suitable for the user device;
   a content interface for communicating with a content server to retrieve requested content;

a transformation engine for dynamically transforming content received from the content server in real time to a suitable format for the user device, and for routing the transformed content to the request handler interface for download to the requesting user device to complete a transaction initiated by the request for content, the transformation engine performing said transformation according to:

intention tags which are in the content and which capture non-presentation properties of the content as intended by an author, including indicating relationships between blocks of content to be preserved in the transformed content, task tags which are in the content and which indicate blocks of the content which are optional or alternative for user device types, and presentation tags indicating content presentation attributes; and the transformation engine converts the content to a document object model (DOM) in which nodes correspond to document tags, and transforms the document object model by parsing tags indicating blocks of content and deciding on transformation on a block-by-block basis according to the task and intention tags.

2. The e-business mobility platform as claimed in claim 1, wherein the user device interface comprises means for causing session manager to generate a session object upon receipt of a user device request, and said session object comprises means for controlling full execution of the session until delivery of the requested content even if the user device changes.

3. The e-business mobility platform as claimed in claim 2, wherein the device interface comprises a device detection function for detecting device attributes, and the session manager comprises means for using said attributes to create a session object.

4. The e-business mobility platform as claimed in claim 3, wherein the device detection function comprises means for accessing a hierarchical device database to retrieve device attributes.

5. The e-business mobility platform as claimed in claim 2, wherein the session manager comprises means for maintaining a list of session for each user and for caching the associated content.

6. The e-business mobility platform as claimed in claim 1, wherein the transformation engine comprises means for dynamically activating providers in series for a session, said providers being for performing a transformation-related function.

7. The e-business mobility platform as claimed in claim 6, wherein at least one provider comprises means or caching reusable intermediate data captured from a stream of content being transformed, and at least one other provider comprises means for using cached data.

8. The e-business mobility platform as claimed in claim 7, wherein a provider comprises means for caching user preference data.

9. The e-business mobility platform as claimed in claim 1, wherein the transformation engine comprises means for applying user preferences to the device-format content.

10. The e-business mobility platform as claimed in claim 9, wherein said preferences are applied by dynamically retrieving preference data from a user database and modifying the content accordingly.

11. The e-business mobility platform as claimed in claim 1, wherein the platform comprises a database system and all functions of the platform comprises means for accessing said database system via accessors each dedicated to a data type.

12. The e-business mobility platform as claimed in claim 11, wherein the data types include user, group, and device data types.

13. The e-business mobility platform as claimed in claim 1, wherein the transformation engine comprises means for combining content by combining DOMs generated from different incoming content streams.

14. The e-business mobility platform as claimed in claim 1, wherein the platform comprises a messaging system comprising means for controlling communication within the platform by passing objects representing events between functions.

15. A computer program product comprising software code for completing a platform as claimed in claim 1 when executing on a digital computer.

16. An e-business mobility platform comprising:

a request handler interface for communicating with a user device to receive a request for content and for downloading the content to the requesting user device in a format suitable for the user device;

a content interface for communicating with a content server to retrieve requested content;

a transformation engine for dynamically transforming content received from the content server in real time to a suitable format for the user device, and for routing the transformed content to the request handler interface for download to the requesting user device to complete a transaction initiated by the request for content, the transformation engine performing said transformation according to:

intention tags which are in the content and which capture non-presentation properties of the content as intended by the author, including indicating relationships between blocks of content to be preserved in the transformed content, task tags which are in the content and which indicate blocks of the content which are optional or alternative for user device types, and presentation tags indicating content presentation attributes; and the transformation engine converts the content to a document object model in which nodes correspond to document tags, and transforms the document object model by parsing tags indicating blocks of content and deciding on transformation on a block-by-block basis according to the task and intention tags;

wherein the transformation engine maintains continuity of a session if the user device changes during the transaction by changing a session parameter identifying the user type in a database;

wherein the transformation engine identifies the type of content requested and subsequently identifies a set of data and content manipulation providers and a sequence for applying the providers to complete the transaction; and wherein cache providers of the transformation engine access and store intermediate data as it passes from one content manipulation provider to a next content manipulation provider.

* * * * *